US010581355B1

(12) United States Patent
Dyson

(10) Patent No.: US 10,581,355 B1
(45) Date of Patent: Mar. 3, 2020

(54) DOUBLE-FED INDUCTION LINEAR OSCILLATING ALTERNATOR

(71) Applicant: United States of Americas as represented by the Administrator of NASA, Washington, DC (US)

(72) Inventor: Rodger W. Dyson, Elyria, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 21 days.

(21) Appl. No.: 15/381,801

(22) Filed: Dec. 16, 2016

Related U.S. Application Data

(60) Provisional application No. 62/269,177, filed on Dec. 18, 2015.

(51) Int. Cl.
*H02P 9/00* (2006.01)
*H02K 35/00* (2006.01)
*H02P 103/20* (2016.01)

(52) U.S. Cl.
CPC ............ *H02P 9/007* (2013.01); *H02K 35/00* (2013.01); *H02P 2103/20* (2015.01)

(58) Field of Classification Search
CPC ........ H02K 35/00; H02K 35/06; H02K 35/02; H02P 9/007; H02P 2103/20
USPC .............. 290/1 R; 310/15, 22, 24, 27, 12.12, 310/12.13; 322/47
See application file for complete search history.

(56) References Cited

U.S. PATENT DOCUMENTS

| | | | | |
|---|---|---|---|---|
| 3,398,302 A * | 8/1968 | Backstein | .............. | H02K 39/00 310/14 |
| 4,394,591 A * | 7/1983 | Aronov | ................ | H02K 44/085 310/11 |
| 4,511,805 A * | 4/1985 | Boy-Marcotte | ....... | F02G 1/0435 290/1 R |
| 4,705,971 A * | 11/1987 | Nagasaka | .............. | H02K 41/02 310/111 |
| 5,146,123 A | 9/1992 | Yarr | | |
| 5,180,939 A | 1/1993 | Rosswurm | | |
| 5,315,190 A * | 5/1994 | Nasar | ..................... | H02K 35/06 310/12.15 |
| 5,389,844 A | 2/1995 | Yarr et al. | | |
| 5,415,529 A * | 5/1995 | Le Boucher | ......... | H02K 41/025 310/11 |
| 5,654,596 A * | 8/1997 | Nasar | .................... | F02G 1/0435 310/12.15 |
| 5,910,691 A * | 6/1999 | Wavre | .................... | H02K 41/03 310/12.18 |
| 6,914,351 B2 | 7/2005 | Chertok | | |
| 6,933,629 B2 | 8/2005 | Qiu et al. | | |
| 7,077,046 B2 * | 7/2006 | Nelyubin | ................ | F41B 6/003 124/3 |

(Continued)

*Primary Examiner* — Julio C. Gonzalez
(74) *Attorney, Agent, or Firm* — Robert H. Earp, III; William M. Johnson

(57) ABSTRACT

A double-fed oscillating linear alternator is provided that includes two concentric Halbach type arrays, one stationary and one movable, that do not require magnets or iron laminations to create a strong magnetic field between the two arrays where the movable array oscillates in a linear motion with respect to the stationary array. The two arrays are manufactured from magnet-less and iron-less conductive material using additive manufacturing techniques.

19 Claims, 5 Drawing Sheets

(56) References Cited

U.S. PATENT DOCUMENTS

| | | | |
|---|---|---|---|
| 7,411,309 B2 | 8/2008 | Hudson | |
| 7,453,241 B2 | 11/2008 | Keiter et al. | |
| 7,994,661 B2 | 8/2011 | Qiu | |
| 8,011,183 B2* | 9/2011 | Berchowitz | F02G 1/043 |
| | | | 290/1 A |
| 8,215,112 B2 | 7/2012 | Owens et al. | |
| 8,269,378 B2* | 9/2012 | Lucas Torralba | H02K 41/03 |
| | | | 310/12.13 |
| 8,415,839 B2 | 4/2013 | Geng et al. | |
| 8,416,045 B2* | 4/2013 | Henning, III | H01F 27/38 |
| | | | 336/110 |
| 8,590,301 B2 | 11/2013 | Wood | |
| 9,038,581 B2* | 5/2015 | Holmes | F02B 71/04 |
| | | | 123/46 E |
| 9,302,577 B2 | 4/2016 | Catalan | |
| 2003/0034697 A1* | 2/2003 | Goldner | B60G 17/0157 |
| | | | 310/17 |
| 2007/0125095 A1 | 6/2007 | Iwasaki et al. | |
| 2010/0123364 A1* | 5/2010 | Hsu | H02K 1/246 |
| | | | 310/180 |
| 2014/0339928 A1* | 11/2014 | Phillips | F03B 13/16 |
| | | | 310/30 |
| 2015/0015354 A1 | 1/2015 | Catalan | |
| 2016/0294267 A1* | 10/2016 | Yamada | H02K 16/04 |

* cited by examiner

DOUBLE-FED INDUCTION LINEAR OSCILLATING ALTERNATOR

CROSS-REFERENCE TO RELATED APPLICATIONS

This application claims the benefit of U.S. Provisional Patent Application Ser. No. 62/269,177 entitled "Iron-Less High Efficiency Double Fed Induction Stirling Linear Alternator for Very High Temperature Environments" filed on Dec. 18, 2015. The entirety of the above-noted application is incorporated by reference herein.

ORIGIN

The invention described herein was made by employees of the United States Government and may be manufactured and used by or for the Government for Government purposes without the payment of any royalties thereon or therefor.

BACKGROUND

Currently, linear alternators used in conjunction with engines, motors, etc. (e.g., Stirling engines, etc.) are typically temperature limited to less than 250° C. operation due to insulation, adhesive, and permanent magnet operating temperature limits. In addition, state of practice linear alternators experience eddy current losses in their iron laminations as well as in their permanent magnets from stator back EMF. These eddy losses result in a total mechanical to electrical conversion system efficiency of less than 95% and usually in the 88%-90% performance range under realistic operating conditions. Moreover, permanent magnets often require adhesives that can out-gas and degrade over time.

Three commonly employed linear alternator architectures and their disadvantages include: moving iron (adds moving weight and hence requires additional costly reactive forces), moving magnet (which can damage somewhat fragile permanent magnets), or moving coil architectures (which adds moving weight and is challenging to connect electrically). The use of iron laminations for flux channeling adds weight and the use of permanent magnet limits the temperature range and ruggedness of the alternator. The use of magnet adhesives introduces potential out-gassing into the working fluid of the engine and further limits the operating temperature range often below 200 C.

Finally, the Stirling engine has fewer control options when only the stator coil is actively controlled. A doubly fed induction architecture provides additional control freedom since both the moving and stationary magnetic fields can be adjusted for both maximum efficiency and power factor. In addition, a traditional Pulse Width Modulated control system may over time, stress the permanent magnets due to higher frequency back EMF and localized heating from induced eddy currents. Moreover, the output signal may develop excessive total harmonic distortion resulting in heavy filtering requirements to reduce electromagnetic interference of sensitive on-board instrumentation.

Overall, the main disadvantage of the prior art may be summarized as limited operational temperature range (all use permanent magnets and adhesive bonding organics and hence limited to below 250° C. operation), limited efficiency (all mechanical to electrical transduction efficiencies are less than 93%), excessive weight, limited control options (all state of the art linear alternators are single-fed (active stator coil) and utilize iron laminations for flux control, all lose magnetic flux beyond the iron and require additional electromagnetic interference protection, all have eddy-current losses in iron lamination and permanent magnets, and all have a part of the cycle in which iron flux path not fully utilized due to either saturation or flux blockage. All of these disadvantages limit the applicability of Stirling technology for both space flight and aircraft applications.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation disclosed herein comprises a novel Stirling linearly oscillating alternator that has the following benefits: enables high temperature operation up to 950 C, minimizes electro-magnetic interference emissions, increases conversion efficiency, increases specific power and minimizes volume. It is based on an iron-less double fed induction topology with additively manufactured copper electromagnetic Halbach stator and mover components.

In another aspect of the innovation, a double-fed oscillating linear alternator is provided that includes two concentric Halbach type arrays, one stationary and one movable, that do not require magnets or iron laminations to create a strong magnetic field between the two arrays where the movable array oscillates in a linear motion with respect to the stationary array. The two arrays are manufactured from magnet-less and iron-less conductive material using additive manufacturing techniques.

In still another aspect of the innovation, an oscillating linear alternator is disclosed that includes a stationary circular electromagnetic array and a movable circular electromagnetic array disposed concentrically around the stationary circular electromagnetic array, wherein the movable circular electromagnetic array is energized with electrical power thereby creating a first magnetic field in the movable circular electromagnetic array, and wherein a mechanical external mover moves the movable circular electromagnetic array in an oscillating linear motion with respect to the stationary circular electromagnetic array thereby inducing a second magnetic field in the stationary circular electromagnetic array.

In still yet another aspect of the innovation, a double-fed oscillating linear alternator is disclosed that includes a stationary assembly including a stationary circular electromagnetic array and a movable assembly including a movable circular electromagnetic array disposed concentrically around the stationary circular electromagnetic array, wherein during operation the movable assembly oscillates in a linear motion with respect to the stationary assembly, wherein a first magnetic field generated by the movable circular electromagnetic array is directed towards the stationary circular electromagnetic array and a second magnetic field generated by the stationary circular electromagnetic array is directed towards the movable circular electromagnetic array, and wherein the first magnetic field and the second magnetic field reside in a gap between the stationary circular electromagnetic array and the movable circular electromagnetic array thereby substantially doubling a magnetic field strength in the gap.

In still yet another aspect of the innovation, a method of operating a double-fed oscillating linear alternator in a double-fed electrical system is disclosed that includes energizing an outer circular electromagnetic array with electrical power, creating a first magnetic field in the outer circular electromagnetic array, oscillating the outer circular electromagnetic array with respect to an inner circular electromagnetic array, inducing a second magnetic field in the inner circular electromagnetic array, producing three phase AC power, converting a portion of the three phase AC power to DC power through a first AC/DC convertor circuit, supplying DC power to the outer circular electromagnetic array, converting a portion of the three phase AC power to DC power through a second AC/DC convertor circuit, and supplying DC power to oscillating and/or rotating loads.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
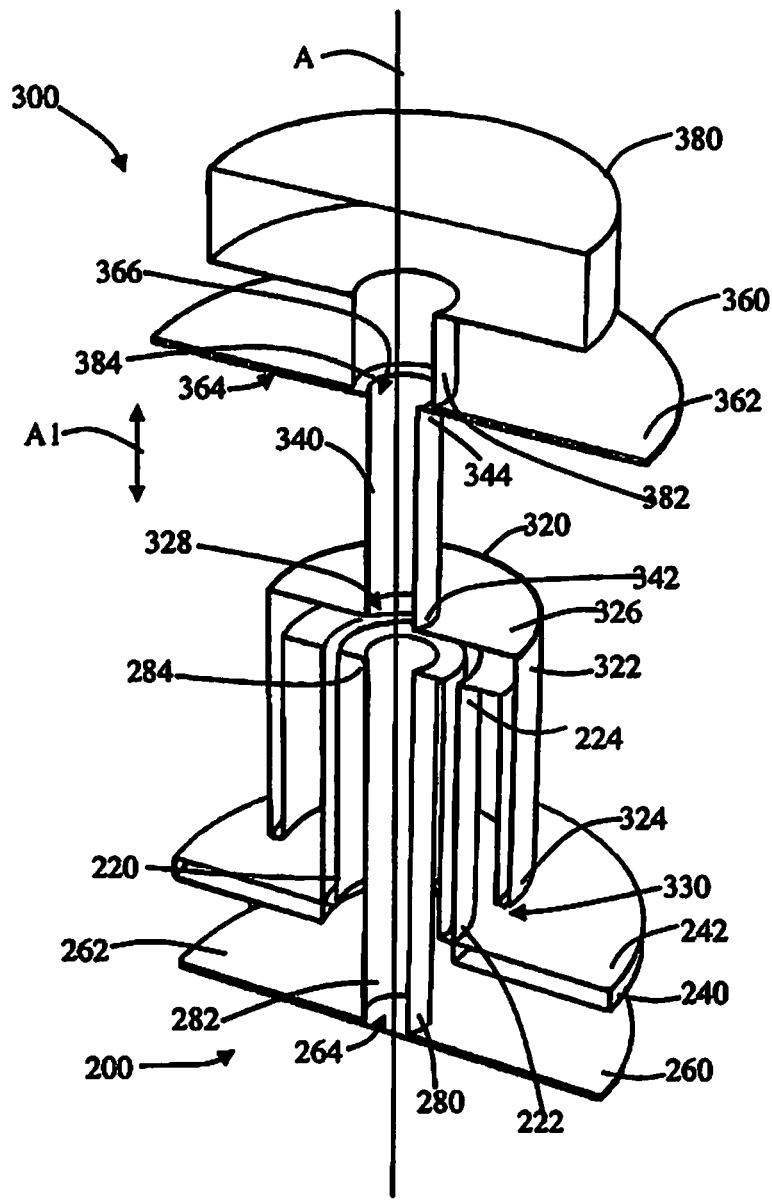
FIG. 1 is a cross-section, perspective view of an innovative linear oscillating alternator in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

In order to overcome the aforementioned disadvantages, the innovation disclosed herein provides a light weight, high specific power, high efficiency, and high temperature linear oscillating alternator that enables unique applications such as, but not limited to, Venus surface power generation and aircraft turbine exhaust bottoming cycle power generation. The innovative linear oscillating alternator utilizes a non-magnet, non-iron, double Halbach type array that is manufactured using additive manufacturing techniques, such as but not limited to, 3D printing. As opposed to magnets used in a Halbach array, the innovation utilizes additive manufacturing to manufacture a monolithic copper mover and stator (forming a double circular array) to generate the required magnetic fields and eliminate the need for iron flux containment.

Each circular array is fabricated as a single piece eliminating the need for organic magnet adhesives. In addition, the coils are printed without insulation and are spaced to take advantage of the Paschen curve, which states arcing will not occur at voltages below 270V in air, for example. In effect, a moving plunger of the linear oscillating alternator is a single piece of copper that effectively forms multiple coils that direct the magnetic flux exactly perpendicular to the cylindrical surface. Electric power is delivered through conducting flexures that mechanically support the piston and provide reactive force for resonance. In addition, the linear oscillating alternator uses double fed induction technology to improve control of the innovative alternator.

Some benefits of the innovative linear oscillating alternator include: 1) it enables high temperature operation up to 950° C., 2) it minimizes electro-magnetic interference emissions, 3) it increases conversion efficiency, and 4) it increases specific power and minimizes volume. Further, the innovative linear oscillating alternator is based on an ironless, double fed induction topology with an additively manufactured copper electromagnetic stator and mover components. Thus, the innovative linear oscillating alternator does not include magnets, which as mentioned above, are limited to applications where the environment temperatures are less than 250° C.

Referring now to the drawings, FIG. 1 is a perspective, cross-sectional view of an example embodiment of a linear oscillating alternator 100 in accordance with an aspect of the innovation. The linear oscillating alternator 100 includes a stationary assembly 200 and a movable assembly 300. The movable assembly 300 oscillates in a linear motion with respect to the stationary assembly 200 along a common axis A of the stationary assembly and the movable assembly 300 as indicated by the double sided arrow A1.

The stationary assembly 200 includes a stationary circular electromagnetic array (stator) 220, a stationary array support 240 for the stationary array 220, a first (stationary) flexure or plunger 260, and a first (stationary) shaft 280. As mentioned above, the stationary array 220 does not include magnets (magnet-less) or iron laminations (iron-less). Rather, the stationary array 220 and the stationary array support 240 are manufactured using additive manufacturing techniques, such as but not limited to 3D printing and are made from a conductive material, such as but not limited to copper.

The stationary array 220 is cylindrical and, thus, has a circular cross-section and has a first (proximate) end 222 and a second (distal) end 224. The stationary array support 240 also has a circular cross-section and includes a first (top) surface 242. The first end 222 of the stationary array 220 is attached to the first surface 242 of the stationary array support 240. The stationary array 220 and the stationary array support 240 are an integrated unit manufactured using additive manufacturing techniques as mentioned above.

The first flexure 260 also has a circular cross-section similar to that of the stationary array support 240 and includes a first (top) surface 262 and an aperture 264 defined therein. The first shaft 280 is disposed inside the first array 220 and is cylindrical and, thus has a circular cross-section and has a first (proximate) end 282 and a second (distal) end 284. The first end 282 is connected to the first surface 262 of the first flexure 260 such that the first shaft 280 encompasses the aperture 264 defined in the first flexure 260.

The movable assembly 300 includes a movable circular electromagnetic array (coil) 320, a second shaft 340, a second plunger or flexure 360, and a piston 380. The movable array 320 is disposed concentrically around the inner array 220. Again, as mentioned above, the movable array 320, like the stationary array 220, does not include magnets (magnet-less) or iron laminations (iron-less). Rather, the movable array 320 is also manufactured using additive manufacturing techniques, such as but not limited to 3D printing and is made from a conductive material, such as but not limited to copper. Thus, the movable array 320 is a single integrated unit.

The movable array 320 is cylindrical and, thus, has a circular cross-section and has a first (proximate) end 322, a second (distal) end 324, and a proximate surface 326 having an aperture 328 centrally defined therein. The proximate surface 326 is attached to the first end 322 thereby enclosing the first end 322 except for the location of the aperture 328. The second end 324 is proximate or adjacent to the first surface 242 of the stationary array support 240, but does not contact the first surface 242. Thus, there is a space 330 between the second end 324 of the movable array 320 and the first surface 242 of the stationary array support 240.

The second shaft 340 is cylindrical and, thus, has a circular cross-section and includes a first (proximate) end 342 and a second (distal) end 344. The first end 342 attaches to the proximate surface portion 326 of the movable array 320 thereby encompassing the aperture 328 defined in the surface portion 326 of the movable array 320. The second shaft 340 extends away from the movable array 320 toward the second flexure 360.

The second flexure 360 also has a circular cross-section similar to that of the first flexure 260 and includes a first (top) surface 362, a second (bottom) surface 364 opposite that of the first surface 362, and an aperture 366 defined therein. The second shaft 340 attaches to the second surface 364 of the second flexure 360 thereby encompassing the aperture 366 defined in the second flexure 360.

The piston 380 has a circular cross-section and includes a shaft 382 having a distal end 384 that attaches to the first surface 362 of the second flexure 360 thereby encompassing the aperture 366 defined in the second flexure 360. As mentioned above, the movable assembly 300 and, hence, the piston 380 oscillates in a linear motion as indicated by the double sided arrow A with respect to the stationary assembly 200 to generate an electrical output. The piston 380 is connected to a motor, such as but not limited to a Stirling motor.

Figure 2:
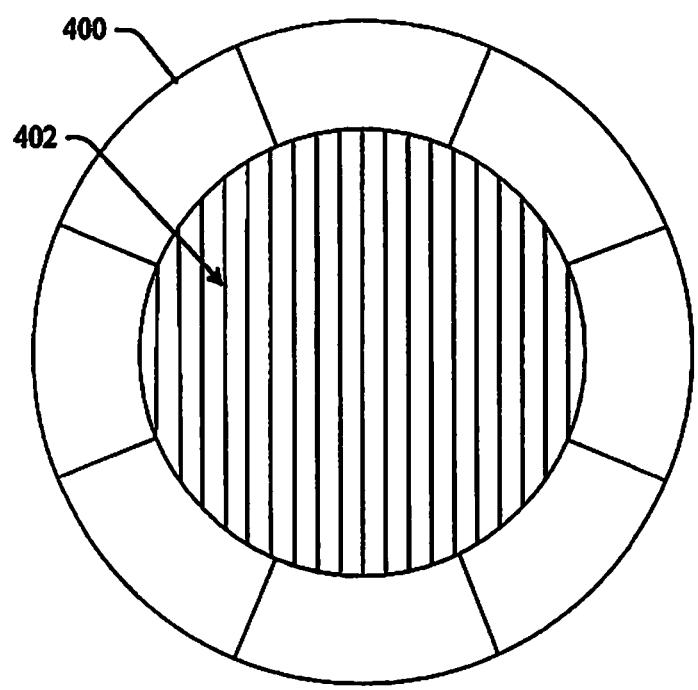
FIG. 2 is an example embodiment of a circular array that illustrates the location of the magnetic field in a Halbach type array in accordance with an aspect of the innovation.
Figure 3:
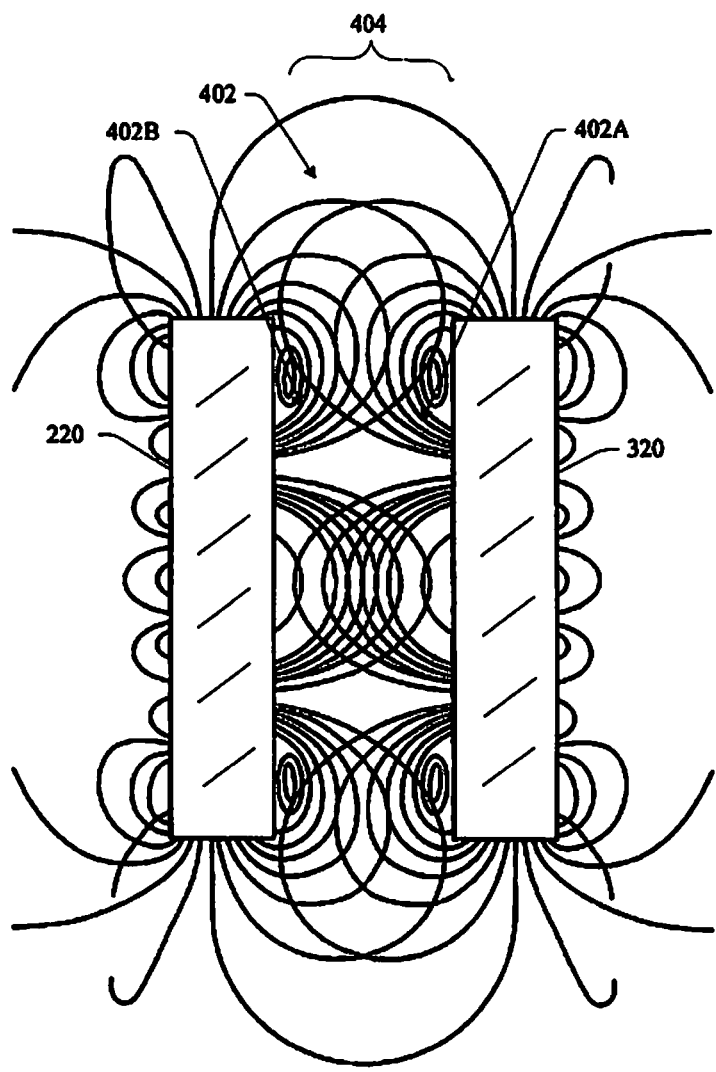
FIG. 3 is a schematic illustration of a double Halbach array illustrating a strength of a magnetic field in accordance with an aspect of the innovation.

Referring to FIGS. 2 and 3, FIG. 2 is an example embodiment of a circular array 400 that illustrates the location of the magnetic field in a Halbach type array in accordance with an aspect of the innovation. Circular arrays can be configured to produce a strong magnetic field 402 inside the array 400 and a weak magnetic field outside of the array or vice versa similar to that of a Halbach magnetic array. Thus, referring to FIG. 3, in the example embodiment disclosed herein, the strength of the magnetic field 402 can be increased in a gap 404 between the stationary array 220 and the movable array 320 by producing a first strong magnetic field 402A inside the movable array 320 and a second strong magnetic field 402B outside the stationary array 220. The stationary and movable arrays 220, 320 are placed in very close proximity and are concentric to each other. This configuration effectively doubles the magnetic field strength the stationary array 220 experiences without the need for iron laminations since the movable array 320 channels the magnetic field inward.

Figure 4:
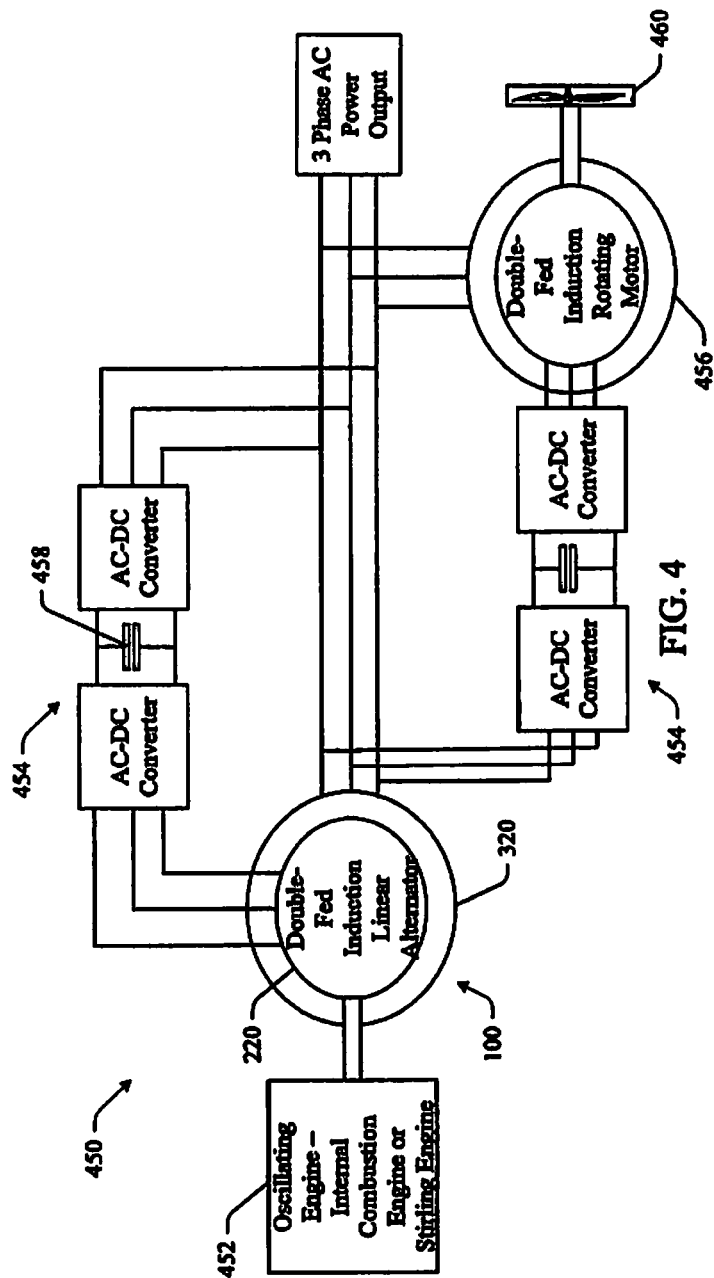
FIG. 4 is a simplified diagram of an electrical system that includes the innovative doubly fed linear oscillating alternator in accordance with an aspect of the innovation.

FIG. 4 is a simplified diagram of an electrical system 450 that includes the innovative doubly fed linear oscillating alternator 100 in accordance with an aspect of the innovation. Thus, another feature of the innovative linear oscillating alternator 100 is that is can utilize doubly fed induction architecture. With an oscillating mechanical input from an oscillating engine (mechanical external mover) 452, such as but not limited to an internal combustion engine, Stirling cycle engine, etc. the plunger will oscillate while having its magnetic field managed by a first AC-DC convertor circuit 454, which includes a DC link capacitor 458 shown in FIG. 5. Moreover, the generated power can be three phase AC that is then used to drive a rotating double fed induction motor 456. In this way, the oscillating engine 452 may be used to drive a rotating component 460 such as a wheel, propeller, etc. without the use of gears or transmission.

In addition, a frequency of the engine may be different than a frequency of the generated three phase AC power, which may also be different than a frequency of the rotating component. This decoupling of the frequency and conversion from the oscillating mechanical source 452 to the rotating mechanical load (or vice-versa) allows each component of the system to operate in its optimal design range. As mentioned above, the doubly fed configuration effectively doubles the magnetic field strength between the stationary array 220 and the movable array 320, as illustrated in FIG. 3.

Figure 5:
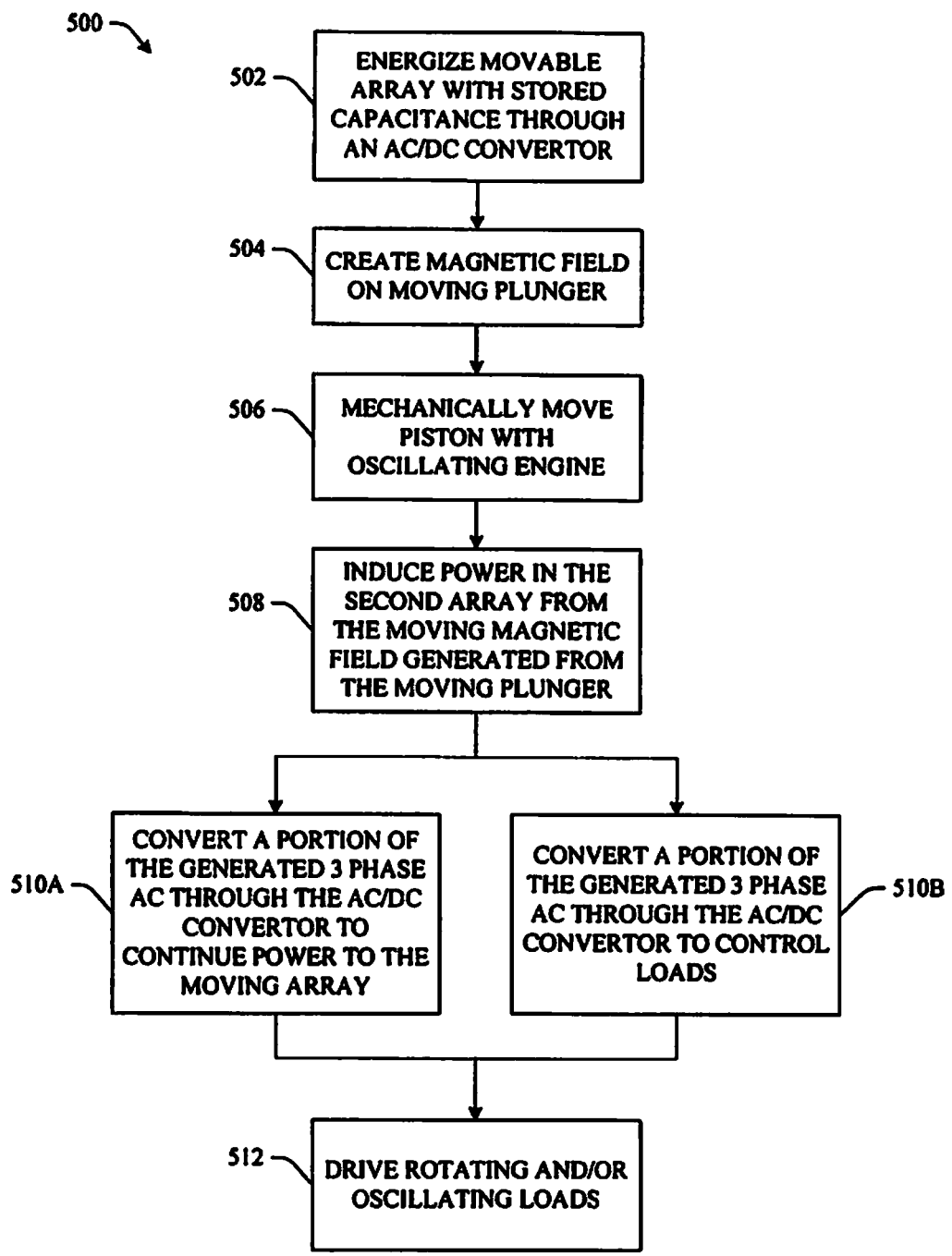
FIG. 5 is a block diagram illustration of the operation of an electrical system having oscillating and/or rotating loads utilizing the innovative doubly-fed induction alternator in a system in accordance with an aspect of the innovation.

FIG. 5 is a block diagram illustration 500 of the operation of an electrical system 450 having oscillating and/or rotating loads utilizing the innovative doubly-fed induction alternator in a system in accordance with an aspect of the innovation. Referring also to FIGS. 1 and 4, at 502, the movable array is energized using energy stored in the DC link capacitor. At 504, a magnetic field is initially created in the movable array. At 506, the mechanically oscillating engine 452 moves the piston 380 thereby moving the movable array, which at 508, induces a moving magnetic field in the stationary array, which produces three phase AC power. Simultaneously, at 510A, a portion of the three phase power is converted to DC power through the first AC/DC convertor circuit 456 to power the movable array and at 510B, a portion of the three phase power is converted to DC power through a second AC/DC convertor circuit 462 to control rotating and/or oscillating loads. At 512, the power from 510A is delivered to oscillating and/or rotating loads to thereby drive the oscillating and/or rotating loads described above.

This double fed architecture is ideally suited for flexure-based linear alternators because the flexures provide a direct electrical contact for supplying current to the plunger throughout the cycle. When the plunger approaches zero velocity at the end stops it is possible to increase the mover magnetic field to continue to produce inductive power in the stator and provide additional reactive spring force.

The power electronics used to control this system may utilize a resonant switching topology to minimize switching losses and both the plunger and stator may be separately controlled to minimize the total harmonic distortion into the load. Overall the power electronics efficiency may be increased and the mass may be reduced compared to a traditional single fed alternator architecture. The maintenance and reliability of this technology is anticipated to be superior to the state of practice linear alternators since sensitive components have been replaced with monolithic 3D printed copper coils. The proposed electrically conductive flexure bearing system is a well-proven support structure for maintaining piston position and stroke.

This technology is unique in that it is the first application of a double fed induction Halbach cylindrical electromagnets for Stirling linear alternators. One advantage of this technology is a significantly reduced mass since it does not require heavy iron to contain the magnetic flux because the Halbach arrangement naturally performs that function, the magnetic strength is now determined by current level and not permanent magnet size, the overall coil dimensions are much smaller due to Halbach array higher magnetic flux density and the internal concentric location of the stator inside the cylindrical plunger.

Another advantage of this technology is the efficiency and control of the alternator is more flexible than current state of practice because the double fed induction topology allows for controlling both coils simultaneously. This enables features such as trading reactive power between the plunger and the stator to optimize efficiency and taking power from both coils to reduce the overall current load losses which grow with the square of the current. Also, the double fed induction topology enables the engine to operate optimally at a different frequency than the output power to the load, similar to how windmill generator farms operate today with varying wind speeds delivering power to a fixed frequency grid load. This minimizes the need for frequency converters and may be used to optimize EMI signature for minimal filtering mass.

Finally, fault protection schemes are more easily implemented by removing plunger current during a fault. This eliminates the moving magnetic field and separates the mechanical motion of the Stirling converter from the electrical power system and effective interrupts power delivery to the faulted circuit.

Overall, the innovation is a very simple design that eliminates iron, permanent magnets, and adhesives while increasing controllability and efficiency using establishing double fed induction. Eliminating the heavy iron and permanent magnets through the use of Halbach array coils greatly reduces the mass. In addition, additive manufacturing of the copper enables precise construction of the Halbach type array. Thus, the innovation enables a new class of light-weight linear alternators capable of highly efficient, extreme environment performance. The innovation is ideal for linear alternator applications because the flexures can deliver electric current to moving components without the need for slip rings.

The high temperature performance is achieved by removing the traditionally sensitive components such as permanent magnets, adhesives, and wire insulation with precisely printed single-piece copper coil components (insulation could be added to the coils in a second step if required for higher voltage operation). The high efficiency performance is achieved by leveraging the recent developments in rotary double-fed induction power electronics. Thus, rotary motor technology can now be leveraged for better linear motor performance.

This technology would enable today's aircraft to generate electric power with Stirling technology using the waste heat from turbofan engines or near any other hot location. In addition, this technology can increase the power output when operated as a linear motor to drive the cryo-coolers used in the medical industry because the higher operating condition permits higher current density in the coils. Other application areas include micro-combined heat and power, deep well drilling, and other hot locations in which power generation or cooling is benefited with Stirling based technology.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. An oscillating linear alternator comprising:
a stationary circular electromagnetic array; and
a movable circular electromagnetic array including monolithic coils surrounding at least a portion of the stationary circular electromagnetic array, wherein:
the movable circular electromagnetic array is energized with electrical power from a power source, thereby creating a first magnetic field in the movable circular electromagnetic array, wherein the power source is separate from the stationary circular electromagnetic array,
a mechanical external mover moves the movable circular electromagnetic array in an oscillating linear motion with respect to the stationary circular electromagnetic array thereby inducing a second magnetic field in the stationary circular electromagnetic array, wherein the oscillating linear motion is along a common central axis of the stationary and movable circular electromagnetic arrays, and
neither the stationary circular electromagnetic array nor the movable circular electromagnetic array includes or has a permanent magnet attached thereto.
2. The oscillating linear alternator of claim 1, wherein the stationary circular electromagnetic array is constructed from an iron-less material that conducts electricity, wherein the stationary circular electromagnetic array is constructed using additive manufacturing techniques.

3. The oscillating linear alternator of claim 1, wherein the movable circular electromagnetic array is constructed from an iron-less material that conducts electricity, wherein the movable circular electromagnetic array is constructed using additive manufacturing techniques.

4. The oscillating linear alternator of claim 1 further comprising a stationary array support attached to a proximate end of the stationary circular electromagnetic array, and wherein the stationary circular electromagnetic array and the stationary array support are an integrated unit and are constructed from an iron-less material that conducts electricity, wherein the stationary circular electromagnetic array and the stationary array support are constructed using additive manufacturing techniques.

5. The oscillating linear alternator of claim 4, wherein the movable circular electromagnetic array includes a proximate end, a distal end, and a proximate surface portion, and wherein the distal end of the movable circular electromagnetic array is disposed near to a first surface of the stationary array support.

6. The oscillating linear alternator of claim 5, wherein the proximate surface portion includes an aperture centrally defined therein and is attached to the proximate end of the movable circular electromagnetic array essentially enclosing the proximate end of the movable circular electromagnetic array.

7. The oscillating linear alternator of claim 6 further comprising a shaft having a first end attached to the proximate surface and a second end, and a flexure attached to the second end of the shaft, wherein the flexure receives the electrical power to energize the movable circular electromagnetic array thereby creating the first magnetic field in the movable circular electromagnetic array.

8. The oscillating linear alternator of claim 7 further comprising a piston attached to a first surface of the flexure, wherein the piston engages the mechanical external mover that moves the piston and the movable circular electromagnetic array in the oscillating linear motion thereby inducing the second magnetic field in the stationary circular electromagnetic array.

9. The oscillating linear alternator of claim 1, wherein the electrical power from the power source is DC current.

10. The oscillating linear alternator of claim 1, wherein the power source is a DC link capacitor electrically coupled to the stationary circular electromagnetic array.

11. The oscillating linear alternator of claim 9, wherein three phase AC power is induced in the stationary circular electromagnetic array, wherein a portion of the three phase AC power is supplied to an AC/DC converter electrically connected to the DC link capacitor.

12. A double-fed oscillating linear alternator comprising:
a stationary assembly including a stationary circular electromagnetic array; and
a movable assembly including a movable circular electromagnetic array including monolithic coils disposed surrounding at least a portion of the stationary circular electromagnetic array,
wherein, during operation, the movable assembly oscillates in a linear motion with respect to the stationary assembly, wherein the linear motion is along a common central axis of the stationary and movable circular electromagnetic arrays, wherein
a first magnetic field generated by the movable circular electromagnetic array is directed towards the stationary circular electromagnetic array and a second magnetic field generated by the stationary circular electromagnetic array is directed towards the movable circular electromagnetic array, and
the first magnetic field is generated via supplying electrical power to the monolithic coils from a storage device that is electrically coupled to both the stationary circular electromagnetic array and the movable circular electromagnetic array, and
the first magnetic field and the second magnetic field reside in a gap between the stationary circular electromagnetic array and the movable circular electromagnetic array thereby substantially doubling a magnetic field strength in the gap, and
neither the stationary circular electromagnetic array nor the movable circular electromagnetic array includes or has a permanent magnet attached thereto.

13. The double-fed oscillating linear alternator of claim 12, wherein the stationary circular electromagnetic array is constructed from an iron-less material that conducts electricity, wherein the stationary circular electromagnetic array is constructed using 3D printing techniques.

14. The double-fed oscillating linear alternator of claim 12, wherein the movable circular electromagnetic array is constructed from an iron-less material that conducts electricity, wherein the movable circular electromagnetic array is constructed using 3D printing techniques.

15. The double-fed oscillating linear alternator of claim 12, further comprising a stationary array support attached to a proximate end of the stationary circular electromagnetic array, and wherein the stationary circular electromagnetic array and the stationary array support are an integrated unit and are constructed from an iron-less material that conducts electricity, wherein the stationary circular electromagnetic array and the stationary array support are constructed using additive manufacturing techniques.

16. The double-fed oscillating linear alternator of claim 15, wherein the movable circular electromagnetic array includes a proximate end, a distal end, and a proximate surface portion, and wherein the distal end of the movable circular electromagnetic array is disposed near to a first surface of the stationary array support.

17. The double-fed oscillating linear alternator of claim 16, wherein the proximate surface portion includes an aperture centrally defined therein and is attached to the proximate end of the movable circular electromagnetic array essentially enclosing the proximate end of the movable circular electromagnetic array.

18. The double-fed oscillating linear alternator of claim 17 further comprising a shaft having a first end attached to the proximate surface and a second end, and a flexure attached to the second end of the shaft, wherein the flexure receives the electrical power to energize the movable circular electromagnetic array thereby creating the first magnetic field in the movable circular electromagnetic array.

19. The double-fed oscillating linear alternator of claim 18 further comprising a piston attached to a first surface of the flexure, wherein the piston engages the mechanical external mover that moves the piston and the movable circular electromagnetic array in the oscillating linear motion thereby inducing the second magnetic field in the stationary circular electromagnetic array.

* * * * *